United States Patent [19]
Kincaid

[11] Patent Number: 5,509,449
[45] Date of Patent: Apr. 23, 1996

[54] CONTROL OF FLUIDS

[75] Inventor: Dennis C. Kincaid, Hansen, Id.

[73] Assignee: The United States of America as represented by the Secretary of Agriculture, Washington, D.C.

[21] Appl. No.: 415,835

[22] Filed: Apr. 3, 1995

[51] Int. Cl.$^6$ .................................................. G05D 16/08
[52] U.S. Cl. ............... 137/505.22; 137/501; 137/505.24; 137/505.47
[58] Field of Search ................... 137/505.47, 505.22, 137/505.24, 501; 251/58

[56] References Cited

U.S. PATENT DOCUMENTS

| | | | |
|---|---|---|---|
| 15,095 | 6/1856 | Wheeler | 251/58 X |
| 249,170 | 11/1881 | Grannan | 251/58 X |
| 1,115,323 | 10/1914 | Mansperger | 137/505.24 |
| 2,888,948 | 6/1959 | Pellmyr et al. | 137/505.47 X |

FOREIGN PATENT DOCUMENTS

| 29420 | 3/1884 | Germany | 137/505.24 |
|---|---|---|---|

*Primary Examiner*—Stephen M. Hepperle
*Attorney, Agent, or Firm*—M. Howard Silverstein; John D. Fado

[57] ABSTRACT

Water pressure in various branches of an irrigation system is controlled by incorporating a butterfly valve in each branch. Each valve is connected to its own piston-cylinder hydraulic assembly. Elongation of the assembly urges the valve toward closure. Shortening of the assembly urges the valve toward opening. A spring operatively associated with the assembly urges the assembly to shorten itself. A tube conveys actuating fluid, i.e., water, into the assembly from the conduit downstream from the valve in opposition to the force of the spring. Whenever the downstream pressure exceeds a predetermined pressure, the actuating fluid overcomes the force of the spring and elongates the assembly thereby moving the valve toward closure. This causes the valve to obstruct the flow of water, thereby returning the downstream pressure to the predetermined magnitude.

12 Claims, 3 Drawing Sheets

CONTROL OF FLUIDS

FIELD OF INVENTION

The invention pertains to means to maintain control over fluids flowing through conduits such as irrigation systems.

PRIOR ART

Pressurized irrigation is used extensively in the United States and usage is increasing. Many sprinkler systems operate on variable topography and require pressure regulation to maintain a desirable pressure range for the sprinkler nozzles. Drip irrigation also requires pressure regulation. Expensive diaphragm type pressure regulators presently are used for pressure control in irrigation systems having conduits with diameters of 3 inches or more. Expensive flow control sprinkler nozzles also are available.

SUMMARY

A new means to maintain control over fluids flowing through a conduit in an irrigation system has been developed comprising (a) a rotatable disk valve within the conduit;

(b) a lever connected to the disk;

(c) first and second axes spaced from the lever and fixed with respect to the conduit when the system is operating;

(d) a spring,
wherein one end of the spring is connected to the first axis, wherein a first imaginary base line passes through the first axis and through the disk's axis of rotation;
wherein the other end of the spring is connected to a first pivot point on the lever, wherein a first imaginary radial line passes from the disk's axis of rotation to the first pivot point;
wherein a first angle is defined, as measured in the direction of closure of the disk, from the first imaginary base line to the first imaginary radial line;
wherein the spring urges the disk toward opening;

(e) a hydraulic assembly,
wherein one end of the assembly is connected to the second axis, wherein a second imaginary base line passes through the second axis and through the disk's axis of rotation;
wherein the other end of the assembly is connected to a second pivot point on the lever, wherein a second imaginary radial line passes from the disk's axis of rotation to the second pivot point;
wherein a second angle is defined, as measured in the direction of disk closure, from the second imaginary base line to the second imaginary radial line, wherein the second angle is less than the first angle;
wherein an increase in pressure in the hydraulic assembly urges the disk toward closure; and (f) a tube connected between the assembly and conduit;
wherein the connection to the conduit is downstream from the disk; wherein the tube supplies actuating fluid from the conduit to the assembly.

As used herein, the expression "disk" or "disk valve" is in reference to a disk-shaped object which, when disposed perpendicularly to fluid flow, extends across most or all of the cross section of a conduit, and wherein the valve includes an axis of rotation in the plane of the disk. When the disk is rotated around its axis, it increases or decreases flow obstruction depending upon its position. Most typically, the disk valve is a butterfly disk or valve in which the axis of rotation generally divides the disk into halves. However, the axis of rotation may be located at other than at the halfway point. For example, in the case of conduits that are not circular in cross-section, such as generally square or rectangular cross-section configurations, the disk may be square or rectangular, and the axis of rotation may be located at the edge of the disk.

The use of manually operated butterfly valves is not a new concept in low pressure irrigation pipelines, as taught in Transactions of the ASAE, vol. 29 no.6, 1986, pp 1685–1691, "Energy Dissipation in Low Pressure Irrigation Pipelines," by Allan S. Humpherys. However, the automatic control system of the present invention, for both high and low pressure systems, is unique.

It is an object to provide a simple, inexpensive and flexible system for controlling fluid pressure in the many branches of an irrigation system, wherein, in the absence of pressure control, there would be undesirable pressure differentials among the branches as a result of variations in topography.

Another object is to provide a system that readily can be retrofitted to existing systems.

Yet another object is to provide a system wherein the spring means which urges the disk valve toward its open position readily and rapidly can be altered in situ by a user not having special skills, so as to accommodate different water supply characteristics.

Still a further object is to provide a system wherein readily available, commercial air-type cylinder actuators may be employed as the hydraulic assembly.

A further object is to provide an inexpensive, lightweight pressure regulating valve for use with movable sprinkler laterals in an irrigation system.

Yet a further object is to provide a simple pressure control device for pipes or conduits having a diameter of 50 mm to 300 mm (2 to 12 inches), carrying flows between 100–10,000 L/min (26–2640 gpm), and having pressures ranging from about 30–600 kpa (5–90 psig).

An even further object is to provide a pressure control device for irrigation purposes which can maintain conduit pressure within 10% of target pressure.

Still another object is to provide a low maintenance pressure control system that is significantly less expensive than individual sprinkler pressure regulators or large capacity diaphragm valves.

An even still further object is to provide a pressure control system for use with flow control sprinkler nozzles to maintain nozzle pressure within desirable limits.

BRIEF DESCRIPTION OF DRAWINGS

Other objects and advantages of the present invention will be obvious from the following more detailed description in conjunction with the drawings in which.

DETAILED DESCRIPTION

Figure 1:
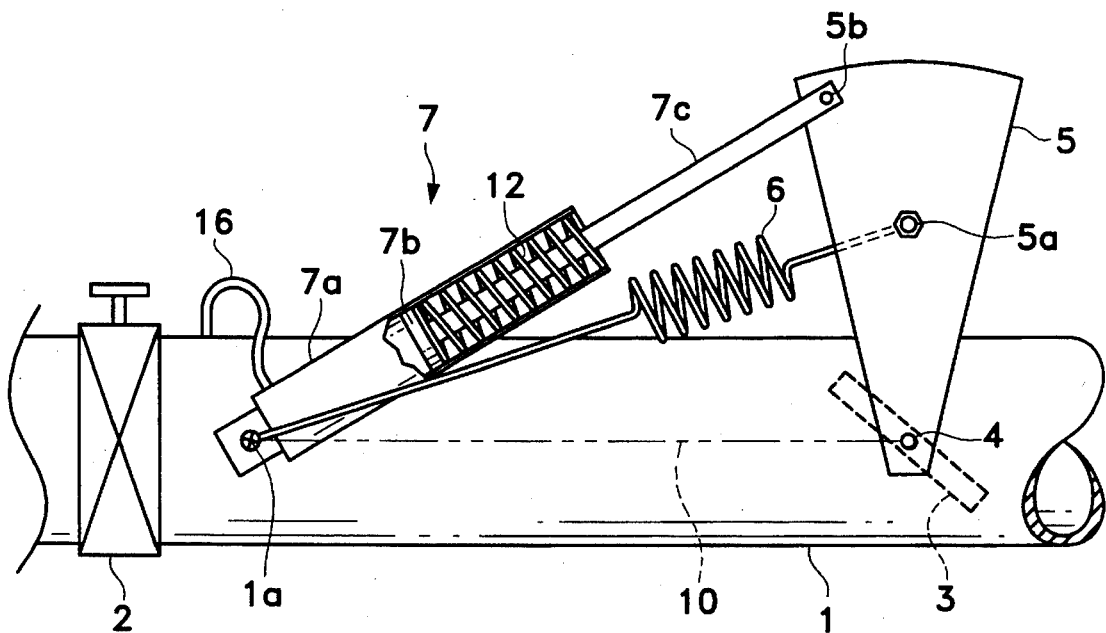
FIG. 1 illustrates the preferred embodiment of the present invention.

Referring to FIG. 1, in its simplest form the apparatus of the present invention comprises a short piece of pipe or conduit 1 having an exemplary length of about 10 to 20 inches and an exemplary diameter of about 3 inches to 12 inches. With appropriate couplings, it readily can be spliced into an existing pipe such as a water irrigation system. Typically, it would be inserted immediately upstream of (a) an adjustable orifice such as a gate valve 2, or (b) an irrigation distribution pipe with one or more sprinklers or outlets.

Reference numeral 3 designates a butterfly valve or disk in the conduit 1. When fully closed, the disk may occupy up to 100% of the cross section of the conduit, preferably about 90% to 95% of the cross section.

Typically, center shaft 4 of the disk, i.e., the disk's axis of rotation, is journalled for rotation in holes drilled into opposite sides of the conduit. One end of shaft 4 protrudes an inch or two beyond the conduit to permit a lever plate 5 to be adjustably attached thereto. Conventional means of adjustability are suitable such as by joining lever plate 5 to a collar that is secured to shaft 4 by means of a set screw. In this manner the angular displacement between lever plate 5 and butterfly 3 readily may be altered as desired.

An external tension spring 6 is connected at one end to axis 1a (e.g., a pin) downstream from the disk valve, and at its opposite end to lever plate 5 at pivot pin 5a. Spring 6 urges butterfly disk 3 toward opening. Reference numeral 10 designates an imaginary base line passing through axis 1a and shaft 4 (the disk's axis of rotation).

One end of a hydraulic assembly 7 pivotally is connected to the conduit 1 at the same point on the conduit (axis 1a) as spring 6. The other end of the assembly is connected to pivot pin or point 5b on the lever plate 5.

Hydraulic assembly 7 includes a cylinder 7a, piston 7b and piston rod 7c. Commercial, single acting, stainless steel piston-cylinder units may be employed. These units typically are available in a variety of bore diameters, 7 to 64 (0.3 to 2.5 inch) and stroke lengths, 50 to 300 mm (2 to 12 inch). Most of these assemblies include an internal compression spring 12 surrounding rod 7a.

A tube 16, such as a flexible plastic tube having a diameter of about ⅛ to ¼ inches, directly is conduit 1 downstream from disk valve 3. The tube supplies conduit fluid directly into the assembly 7 in opposition to the opening force of springs 12 and 6 upon lever plate 5. Most of the opening force is provided by spring 6. Internal compression spring 12 is not critical and may be omitted.

Figure 2:
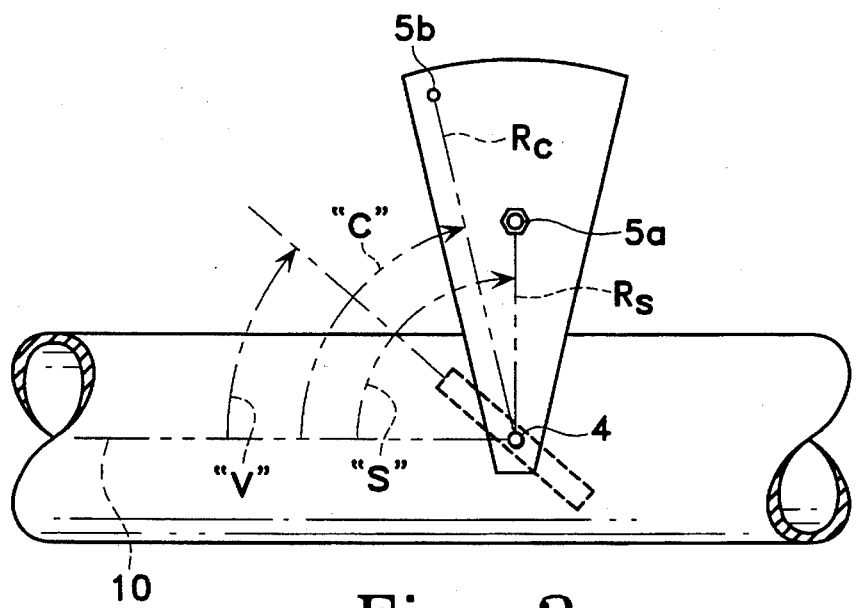
FIG. 2 shows some of the parameters of FIG. 1.

Referring to FIG. 2, a first angle "s" defines an angle measured from imaginary base line 10, in the direction of disk closure, to an imaginary radial line extending from shaft 4 to pivot pin 5a. A second angle "c" defines an angle measured from imaginary base line 10, in the direction of disk closure, to an imaginary radial line extending from shaft 4 to pivot pin 5b. Preferably, pivot pins 5a and 5b are spaced apart (as shown) and are arranged such that the second angle "c" is less than the first angle "s". As explained in more detail below, this angular differential enables the system to achieve a more desirable response to changes in downstream pressure.

Reference numeral "v" represents the butterfly angle that is varied when upstream pressure fluctuations cause undesirable downstream pressures.

Details of attachment of all the above parts readily will be apparent to those skilled in the art. Obviously, the points where shaft 4 passes through the conduit wall should contain appropriate bearing means and must be sufficiently sealed at one end such as by means of O-ring seals so as to prevent leakage through the conduit wall.

In operation, at low pressure, piston 7a is retracted in cylinder 7b so that the hydraulic assembly 7 is at its shortest length. Under these conditions, the disk valve is in its "open" position, and the pressure essentially is the same upstream and downstream of the disk. As the upstream pressure increases, the downstream pressure likewise increases. As soon as the downstream pressure increases above a predetermined pressure, the hydraulic assembly extends in length and moves the butterfly toward closing, in order to limit the downstream pressure to the predetermined level.

The "open" position of the butterfly valve is not necessarily fully horizontal. In most instances, at a small butterfly disk angle there will be no appreciable or significant or even measurable difference between upstream and downstream pressure. The "open" position of the disk preferably should be maintained at the maximum angle that produces no significant or measurable difference between upstream and downstream pressure. This will enable the action of the pressure control system to produce an immediate effect on downstream pressure whenever the downstream pressure reaches an undesirable magnitude. For this purpose, it has been found, for a wide range of parameters, that a disk angle of about 20° is suitable as the "open" position.

In the preset open position, the cylinder is fully retracted, so the disk valve will remain in this position even with no water in the system. The retracted cylinder acts as a "stop" to further counterclockwise rotation of the lever and disk. The strength of spring 6 is such that, at the "stop" position, it still exerts a counterclockwise rotational force or torque on the disk. (The internal compression spring 12 in assembly 7 ordinarily contributes insignificantly to this force.) The force or torque of spring 6 at the stop position approximately is equal to the clockwise rotational force or torque generated by the downstream liquid at the predetermined pressure mentioned above. Thus, only after the downstream pressure exceeds the predetermined pressure will the lever and disk commence rotating in a clockwise direction.

In the preferred practice of the present invention, the pressure at which clockwise rotation of the disk actually commences is not necessarily the target pressure which one wishes to maintain downstream of the disk. Rather, the pressure at which rotation commences may be about 95% of the target pressure. If and when the pressure continues to increase downstream, the disk continues moving in the direction of the maximum closure point.

Maximum closure is not necessarily full closure (full closure occuring when the butterfly essentially is perpendicular to flow, i.e., 85°–90°). For example, with regard to typical flow rates through a water irrigation system, the device readily may be designed to obtain maximum closure when the downstream pressure is about 105% of the target pressure, and, for such an arrangement, the angle of maximum closure typically would be about 70°–80°.

As demonstrated hereinafter, the mechanics of the valve control may be described by standard trigonometric equations, provided it is assumed that 1. the hydraulic forces on the valve are balanced and produce no net torque on the shaft; and
2. friction in the cylinder and shaft may be neglected.

The following equations, in reference to FIG. 2, may be employed to determine the variable lengths of hydraulic assembly 7 and spring 6 during operation of the system:

$$L_c = (R_c^2 + B^2 - 2BR_c \text{cosine } "c")0.5 \qquad (1)$$

$$L_s = (R_s^2 + B^2 - 2BR_s \text{cosine } "s")0.5 \qquad (2)$$

where

B is the length of imaginary line 10 in FIG. 1;

$L_c$ is length of cylinder;

$L_s$ is length of external spring;

$R_c$ is radius of cylinder attachment measured from shaft 4;

$R_s$ is radius of spring attachment measured from shaft 4. The initial or minimum lengths of $L_{co}$ and $L_{so}$ may be computed from equations 1 and 2 by inserting measured values of angles "c" and "s".

At any position of the butterfly, the shaft torque produced by the cylinder pressure force (minus the internal spring force) acting on the lever is equal and opposite to the shaft torque produced by the external spring 6 acting on the lever.

The following equations may be employed to determine the pressure downstream ($P_2$) from disk valve 3 (but upstream from gate valve 2) required to maintain the lever at a fixed position:

$$P_2 = [S_r\{F_{so} + k_s(L_s - L_{so})\} + F_{co} + k_c(L_c - L_{co})]/C \qquad (3)$$

where

C is area of cylinder piston, mm$^2$;

$F_{co}$ is initial force of cylinder measured as Newtons, N $F_{so}$ is initial force of spring measured as N $k_c$ is cylinder spring constant, N/mm $k_s$ is external spring constant, N/mm $L_{co}$ is the initial length of the cylinder $L_{so}$ is the initial length of the spring and $$S_r = (L_c/L_s)[\{R_s + B - L_s)(L_s + B - R_s)\}/\{(R_c + B - L_c)(L_c + B - R_c)\}]0.5 \qquad (4)$$

Equations 1 through 4 comprise a model of the valve control. The hydraulics of the valve and downstream flow conditions are needed to complete the model. Humphreys (1986) derived the head loss coefficient for the butterfly valve as $$k_b = a \, e^{b"v"} \qquad (5)$$

where $k_b$ is the ratio of head loss through the butterfly valve to the velocity head in the main pipe, and a and b are constants.

The butterfly valve is assumed to be supplying flow to a fixed system (e.g., sprinker laterals) which is simulated by the downstream gate valve 2 in FIG. 1 modelled by $$Q = k_u C_v (P_2 - P_o)0.5 \qquad (6)$$

where

Q is total flow in the pipeline;

$C_v$ is the standard industry flow coefficient defined as the flow through the valve in gallons per minute (gpm) at a pressure loss of one psi;

$k_u$ is a units conversion factor. ($k_u$=1 for Q in gpm and P in psi, $k_u$=1.441 for Q in liters/min and P in kPa).

$P_o$ is psi downstream from gate valve 2 in FIG. 1.

Equations 1 through 6 comprise a complete model of the system performance.

There is no simple way to solve directly for $P_2$ as a function of the upstream pressure $P_1$. However, by specifying the geometric parameters and varying the valve position, system performance can be calculated as follows:

1. Measure initial angles "c", "s" and "v", and calculate $L_{co}$ and $L_{so}$. (equations 1 and 2)
2. Assume a change in "v" (e.g., initial "v" +5 degrees), and calculate $L_c$ and $L_s$. (equations 1 and 2)
3. Calculate $S_r$ and $P_2$. (equations 3 and 4)
4. Calculate Q. (equation 6)
5. Using Q, calculate the velocity head ($v^2/2$ g) and the head loss through the valve. (equation 5)
6. Add the head loss to the value of $P_2$ to obtain $P_1$.
7. Repeat steps 2 through 6 for increasing values of "v", and construct a plot of $P_2$ versus $P_1$. This is the performance curve for the pressure regulator.

The effect of changing any parameter easily can be evaluated from the above. It can be shown that the control is able to maintain a nearly constant downstream pressure over a wide range of flow rates.

Through the above formulas it has been established that a more desirable response to pressure fluctuations may be attained when angle "c" (FIG. 2) is less than angle "s", preferably at an angular differential of about 10°–40°, more preferably at about 20°–30°.

For a system having about 106 gpm water flow rate through a 3-inch pipe, the following typical parts and parameters may be employed in the practice of the present invention:

1. butterfly valve that covers 91% of the pipe area;
2. commercial single acting, stainless steel air cylinder, bore diameter 32 mm, piston area 792 square mm, 102 mm stroke at full closure of butterfly, internal spring constant k, 0.22N/mm;
3. minimum length of spring, 143 mm; outside diameter, 21 mm; number of turns, 45; wire diameter, 2.4 mm; spring constant $k_s$, 0.78N/mm (4.5 lb/inch);
4. distance from butterfly shaft to point of connection of cylinder to pipe, 355 mm;
5. distance from butterfly shaft to lever pivot point for cylinder, 90 mm;
6. distance from butterfly shaft to lever pivot point for external spring, 60 mm;
7. "open" angle of "v", 22°;
8. angle "c" ("v" is "open"), 42°;
9. angle "s" ("v" is "open"), 62°.

For a specific flow system, selection of the hydraulic assembly and external spring should be coordinated because these two parts work together. Preferably, the way to select these components is to set up model equations (see above) on a spreadsheet program, specify cylinder area, length and other fixed parameters (the internal spring may be eliminated), and then vary the initial spring tension and spring constant until the desired control pressure and response is obtained.

Figure 3:
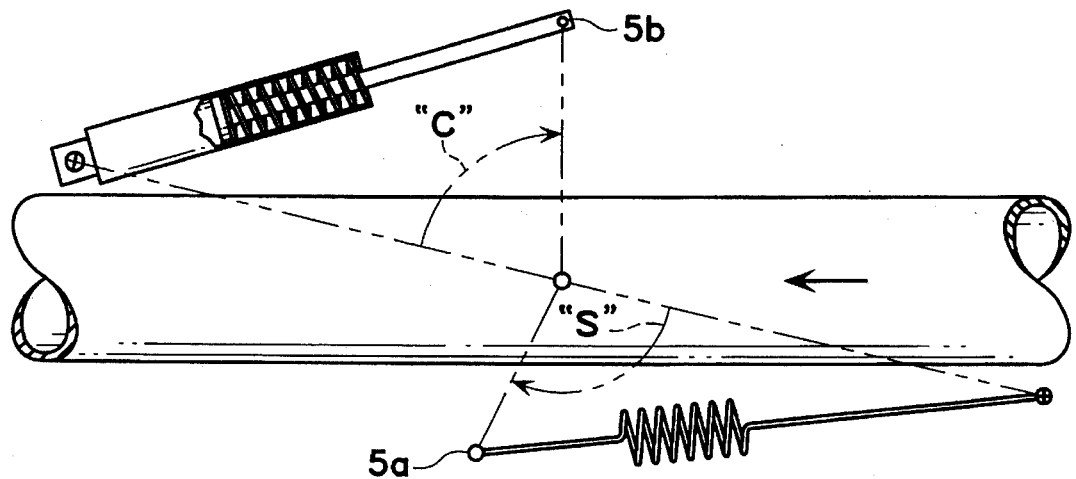
FIG. 3 is an alternative embodiment in which pivot points are on opposite sides of the butterfly axis.

An optional embodiment of the present invention is illustrated in FIG. 3 in which the external spring and hydraulic assembly are located on opposite sides of the butterfly. It will be seen from this figure that the ends of the spring and assembly that are remote from the lever can be other than directly connected to the conduit, and need not be connected to coincident axes such as pivot pin 1a in FIG. 1. It is necessary only that each of these connections be fixed with respect to the conduit during operation of the apparatus. This type of connection might be accomplished by a fixture located adjacent the conduit or by means of an arm or bar attached to the conduit and including a pivot pin thereon.

It further may be noted from FIG. 3, that, in distinction to FIG. 1, the imaginary base line passing through the disk's axis of rotation to the opposite end of the cylinder is not coincident with the imaginary base line passing to the opposite end of the spring. Nontheless when angles "c" and "s" are measured from these base lines, in the direction of disk closure, toward their respective radial lines, angle "c" preferably should be less than angle "s", for reasons explained above.

Referring now to the embodiment of FIG. 4, once again the cylinder and spring are on opposite sides of the disk valve as in FIG. 3. However, in this embodiment the spring is a compression spring rather than tension spring, so that it pushes against its pivot point on the lever. As in the previous figures, the connections to the lever are such that angle "c" is less than angle "s".

Figure 4:
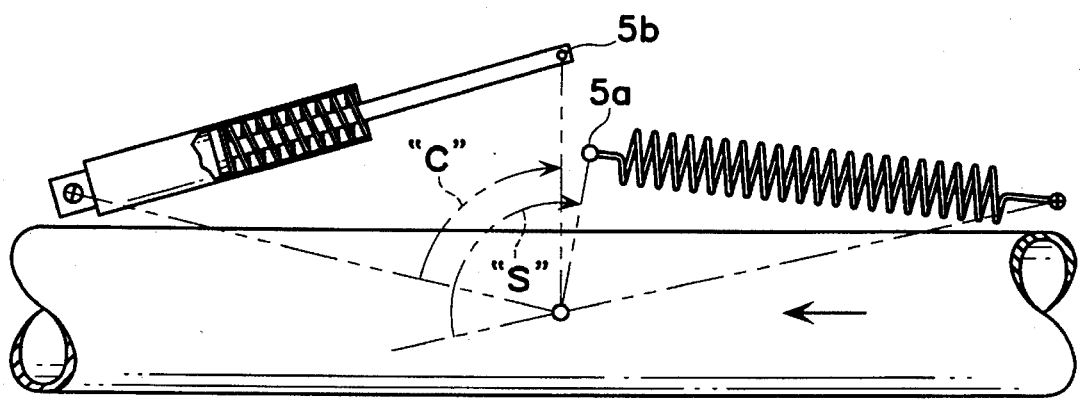
FIG. 4 is an alternative embodiment in which pivot points are on opposite sides of the butterfly axis and a compression spring is employed.

With further reference to the embodiments in FIGS. 1, 3 and 4, three more embodiments would be created by reversing the flow through the valve, while still providing downstream actuating fluid to the hydraulic assembly.

It will be seen that still further embodiments may be provided by supplying actuating fluid to the hydraulic assembly in such a manner as to shorten rather than lengthen the assembly when moving the disk toward closure.

Figure 5:
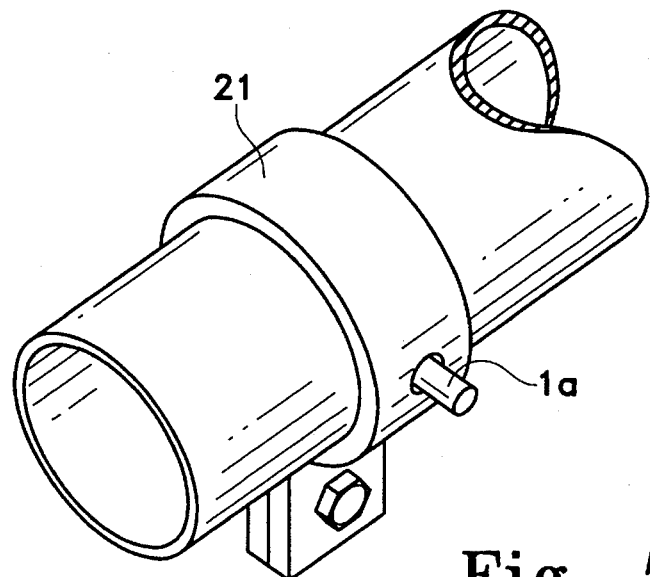
FIG. 5 is an alternative embodiment in which the pivot points are longitudinally movable along the conduit.

Another option is shown in FIG. 5. Referring thereto, reference numeral 21 designates a movable strap type clamp around conduit 1, wherein the strap includes the pivot point or pin 1a at which the hydraulic assembly and spring 6 are attached. In this manner, the length of imaginary line 10 may be adjusted by moving strap 21 to accommodate a cylinder and/or spring of particular lengths, and to aid in setting the initial disk angle "v" (FIG. 2).

In order to reduce undesirable hysteresis during the regulation of pressure, friction at the bearing surfaces of valve shaft 4 should be reduced, and a small clearance between the outer edge of the disk at the pipe wall should be maintained. A non-sealing disk, i.e., a disk that does not cover the entire cross section of the conduit, e.g., with an area of about 90°–95% of the conduit cross section, in many instances will be adequate to cause sufficient head loss across the valve so as to reduce downstream pressure when the disk value is moved toward closing.

While a simple O-ring shaft seal may be employed at the shaft bearing surfaces, more advanced bearings and shaft seals would tend to reduce friction at such location.

Whatever mechanisms may be employed to reduce hysteresis caused by the disk valve, friction within cylinder assembly 7 may also cause same. This problem may be reduced by the use of larger diameter cylinders wherein a change in pressure will yield a correspondingly larger change in the force.

A single size cylinder will be able to handle several disk valve sizes and pressure ranges, but larger conduits and/or large pressure drops may require large cylinders because of large forces on the valve.

Sensitivity and control accuracy is largely determined by adjustment of spring 6. Setting the intial tension to a large value, and reducing radius R (see FIG. 2) by altering the location of the spring pivot pin on lever 5, results in greater sensitivity, although an optimum balance must be achieved between sensitivity and hysteresis.

Internal spring 12 in hydraulic assembly 7 is not critical and may be removed from the system. Under these circumstances, a spring 6 would be selected to compensate for the absence of the spring force within the hydraulic assembly.

Figure 6:
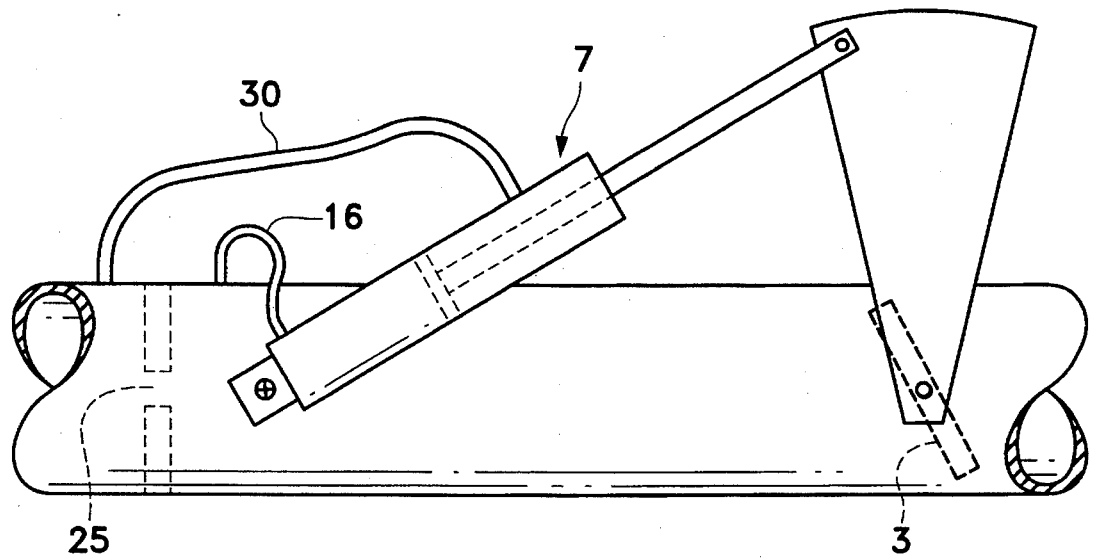
FIG. 6 is an alternative embodiment in which the system controls flow rate rather than downstream pressure.

Referring now to FIG. 6, therein is depicted a system that controls flow rate in the conduit rather than downstream pressure. This embodiment includes a downstream orifice 25 and a second tube 30 connected between the hydraulic assembly and the conduit downstream from orifice 25. The fluid supplied to the hydraulic assembly 7 through tube 30 opposes the force of the fluid pressure supplied by the first tube 16. In this manner, a predetermined pressure differential across orifice 25, or in other words the mass flow rate across orifice 25, controls the position of disk valve 3. Thus, if the pressure begins to increase between orifice 25 and disk valve 3, and thereby changes the pressure differential across orifice 25, then the system causes elongation of hydraulic assemble 7 with resultant closure of disk valve 3, to restore the system toward a predetermined pressure drop or flow rate across orifice 25.

I claim:

1. Pressurized irrigation apparatus for supplying pressurized water through an irrigation conduit operating on variable topography comprising
    (a) a rotatable butterfly disk within said irrigation conduit to open and close said irrigation conduit to water flow; said disk having an axis of rotation;
    (b) lever means connected to said axis of rotation; said lever means having spaced apart first and second pivot points thereon;
    (c) first and second axes spaced from said lever means that are fixed with respect to said irrigation conduit during operation of said apparatus; wherein said first and second axes are spaced from one another;
    (d) a spring,
        wherein one end of said spring is connected to said first axis, wherein a first imaginary base line passes through said first axis and through said disk's axis of rotation;
        wherein the other end of said spring is connected to said first pivot point on said lever means, wherein a first imaginary radial line passes from said disk's axis of rotation to said first pivot point;
        wherein a first angle is defined, as measured in the direction of disk closure, from said first imaginary base line to said first imaginary radial line;
        wherein said spring urges said disk toward opening;
    (e) a hydraulic assembly comprising a piston and cylinder,
        wherein one end of said assembly is connected to said second axis, wherein a second imaginary base line passes through said second axis and through said disk's axis of rotation;
        wherein the outer end of said assembly is connected to said second pivot point on said lever means, wherein a second imaginary radial line passes from said disk's axis of rotation to said second pivot point;
        wherein a second angle is defined, as measured in the direction of disk closure, from said second imaginary base line to said second imaginary radial line, wherein said second angle is substantially 20°–30° less than said first angle;
        wherein an increase in pressure in said hydraulic assembly urges said disk toward closure; and
    (f) a tube connected between said assembly and irrigation conduit; wherein the connection to said irrigation conduit is downstream from said disk; wherein said tube supplies water as actuating fluid from said irrigation conduit to said assembly.

2. Apparatus to maintain pressure control over fluid flowing through a conduit comprising
    (a) a rotatable disk within said conduit to open and close said conduit to fluid flow; said disk having an axis of rotation;
    (b) lever means connected to said axis of rotation; said lever means having spaced apart first and second pivot points thereon;

(c) first and second axes spaced from said lever means that are fixed with respect to said conduit during operation of said apparatus;

(d) a spring, wherein one end of said spring is connected to said first axis, wherein a first imaginary base line passes through said first axis and through said disk's axis of rotation;

wherein the other end of said spring is connected to said first pivot point on said lever means, wherein a first imaginary radial line passes from said disk's axis of rotation to said first pivot point;

wherein a first angle is defined, as measured in the direction of disk closure, from said first imaginary base line to said first imaginary radial line;

wherein said spring urges said disk toward opening;

(e) a hydraulic assembly, wherein one end of said assembly is connected to said second axis, wherein a second imaginary base line passes through said second axis and through said disk's axis of rotation;

wherein the other end of said assembly is connected to said second pivot point on said lever means, wherein a second imaginary radial line passes from said disk's axis of ration to said second pivot point;

wherein a second angle is defined, as measured in the direction of disk closure, from said second imaginary base line to said second imaginary radial line, wherein said second angle is less than said first angle;

wherein an increase in pressure in said hydraulic assembly urges said disk toward closure;

(f) a tube connected between said assembly and conduit; wherein the connection to said conduit is downstream from said disk; wherein said tube supplies actuating fluid from said conduit to said assembly; and wherein said first and second axes are coincident so that said first and second imaginary base lines are coincident.

3. The apparatus of claim 2 wherein said hydraulic assembly comprises a cylinder and piston; and wherein said disk is a butterfly.

4. The apparatus of claim 2 wherein said first and second axes are connected to said conduit and are movable with respect to said conduit.

5. The apparatus of claim 4 wherein said butterfly is at an angle of about 20° at said predetermined open position.

6. The apparatus of claim 3 wherein said first and second axes are connected to said conduit and are movable with respect to said conduit.

7. The apparatus of claim 4 wherein said second angle is about 10°–40° less than said first angle.

8. The apparatus of claim 6 wherein said second angle is about 10°–40° less than said first angle.

9. The apparatus of claim 7 wherein said second angle is about 20°–30° less than said first angle.

10. The apparatus of claim 8 wherein said second angle is about 20°–30° less than said first angle.

11. Apparatus to maintain pressure control over fluid flowing through a conduit comprising (a) a rotatable butterfly disk within said conduit to open and close said conduit to fluid flow; said disk having an axis of rotation;

(b) lever means connected to said axis of rotation; said lever means having spaced apart first and second pivot points thereon;

(c) first and second axes spaced from said lever means that are fixed with respect to said conduit during operation of said apparatus;

(d) a spring, wherein one end of said spring is connected to said first axis, wherein a first imaginary base line passes through said first axis and through said disk's axis of rotation;

wherein the other end of said spring is connected to said first pivot point on said lever means, wherein a first imaginary radial line passes from said disk's axis of rotation to said first pivot point;

wherein a first angle is defined, as measured in the direction of disk closure, from said first imaginary base line to said first imaginary radial line;

wherein said spring urges said disk toward opening;

(e) a hydraulic assembly, wherein one end of said assembly is connected to said second axis, wherein a second imaginary base line passes through said second axis and through said disk's axis of rotation;

wherein the other end of said assembly is connected to said second pivot point on said lever means, wherein a second imaginary radial line passes from said disk's axis of rotation to said second pivot point;

wherein a second angle is defined, as measured in the direction of disk closure, from said second imaginary base line to said second imaginary radial line, wherein said second angle is less than said first angle by substantially 10°–40°;

wherein an increase in pressure in said hydraulic assembly urges said disk toward closure; and (f) a tube connected between said assembly and conduit; wherein the connection to said conduit is downstream from said disk; wherein said tube supplies actuating fluid from said conduit to said assembly;

wherein said first and second pivot points are on opposite sides of said disk's axis of rotation, and wherein said spring is a compression spring.

12. Apparatus to maintain pressure control over fluid flowing through a conduit comprising (a) a rotatable butterfly disk within said conduit to open and close said conduit to fluid flow; said disk having an axis of rotation;

(b) lever means connected to said axis of rotation; said lever means having spaced apart first and second pivot points thereon;

(c) first and second axes spaced from said lever means that are fixed with respect to said conduit during operation of said apparatus;

(d) a spring, wherein one end of said spring is connected to said first axis, wherein a first imaginary base line passes through said first axis and through said disk's axis of rotation;

wherein the other end of said spring is connected to said first pivot point on said lever means, wherein a first imaginary radial line passes from said disk's axis of rotation to said first pivot point;

wherein a first angle is defined, as measured in the direction of disk closure, from said first imaginary base line to said first imaginary radial line;

wherein said spring urges said disk toward opening;

(e) a hydraulic assembly, wherein one end of said assembly is connected to said second axis, wherein a second imaginary base line passes through said second axis and through said disk's axis of rotation;

wherein the other end of said assembly is connected to said second pivot point on said lever means, wherein a second imaginary radial line passes from said disk's axis of rotation to said second pivot point;

wherein a second angle is defined, as measured in the direction of disk closure, from said second imaginary base line to said second imaginary radial line, wherein said second angle is less than said first angle by substantially 10°–40°;

wherein an increase in pressure in said hydraulic assembly urges said disk toward closure; and (f) a tube connected between said assembly and conduit; wherein the connection to said conduit is downstream from said disk; wherein said tube supplies actuating fluid from said conduit to said assembly;

wherein said first and second pivot points are connected to said conduit, and are longitudinally movable along the length of said conduit.

* * * * *